US000001371H

United States Statutory Invention Registration [19]

[11] Reg. Number: H1371

Bucker et al.

[43] Published: Nov. 1, 1994

[54] SUBMERGED SENSING SYSTEM USING LINE ARRAY SEGMENTS

[75] Inventors: Homer P. Bucker; Michael F. Morrison; R. Bruce Williams; Jack R. Olson; Richard C. Shockley, all of San Diego, Calif.

[73] Assignee: The United States of America as represented by the Secretary of the Navy, Washington, D.C.

[21] Appl. No.: 115,964

[22] Filed: Aug. 25, 1993

[51] Int. Cl.[5] ..... H04B 11/00

[52] U.S. Cl. ..... 367/134

[58] Field of Search ..... 367/131, 134, 154, 20; 340/870.13

[56] References Cited

U.S. PATENT DOCUMENTS

| | | | |
|---|---|---|---|
| 3,372,368 | 3/1968 | Dale et al. . | |
| 3,418,624 | 12/1968 | Massa . | |
| 3,982,222 | 9/1976 | Urick . | |
| 4,064,479 | 12/1977 | Ruehle . | |
| 4,901,287 | 2/1990 | Hathaway et al. . | |
| 5,010,530 | 4/1991 | Riley | 367/154 |
| 5,272,476 | 12/1993 | McArthur et al. | 340/870.13 |

*Primary Examiner*—Daniel T. Pihulic

*Attorney, Agent, or Firm*—Harvey Fendelman; Thomas Glenn Keough

[57] ABSTRACT

An underwater sensing system has a trunk cable that transmits a plurality of clock signals from its first end to its second end. A plurality of signal handling nodes are installed successively along the trunk cable in a spaced apart relationship. Each of a plurality of linear sensor arrays extend from one signal handling node. Each sensor in the sensor arrays receives the clock signals and generates a data output signal in response thereto at specifically ordered time sampled intervals based on a count of the clock signals. The data output signals are transmitted to the one signal handling node associated with the sensor array. At each of the signal handling nodes, a multiplexer interleaves the data output signals received from its sensor array in a continual throughput, time-division multiplexed fashion with concatenated data output signals received from the next successive signal handling node located further from the first end of the trunk cable.

24 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SUBMERGED SENSING SYSTEM USING LINE ARRAY SEGMENTS

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of underwater sensing systems, and more particularly to a submerged sensing system using line array segments that extend from a trunk cable.

BACKGROUND OF THE INVENTION

Undersea acoustic sensing systems typically involve a single towed or bottom-mounted (i.e., horizontal) cable array or a single free-floating vertical cable array. In the case of a horizontal array, only bearing is detected while vertical resolution (in terms of angle of depression/elevation) is sacrificed. In the case of a vertical array, angle of depression/elevation is detected at the expense of bearing.

Therefore, a need exists in the state of the art for an undersea acoustic sensing system that can resolve the arrival of acoustic energy in terms of bearing and angle of depression/elevation. Accordingly, it is an object of the present invention to provide an improved underwater sensing system that can simultaneously resolve bearing and angle of depression/elevation of an impinging acoustic signal. Another object of the present invention is to provide an improved underwater acoustic sensing system that accommodates a large number of sensors while minimizing the system processing to minimize the power requirements of the system.

SUMMARY OF THE INVENTION

In accordance with the present invention, an underwater acoustic sensing system is provided. A trunk cable transmits a plurality of clock signals from its first end to its second end. A plurality of operably coupled signal handling nodes which may be electrical are installed successively along the trunk cable in a spaced apart relationship. Each successive one of the signal handling nodes is located further from the first end of the trunk cable. Each of a plurality of array cables extend from a corresponding one of the signal handling nodes. Each array cable is also operably connected to the trunk cable at its corresponding signal handling node. A plurality of hydrophone assemblies are installed along, and are operably connected to, each array cable in a spaced apart relationship for receiving the clock signal. Each hydrophone assembly generates an output signal indicative of an acoustic pressure impinging thereon in response to the clock signals. A sampling circuit is included as part of each hydrophone assembly to control when each hydrophone assembly is sampled. The output signal from each hydrophone assembly passes on its corresponding array cable to its corresponding signal handling node. A multiplexer, located at each of the signal handling nodes, is operably connected to the trunk cable and to its corresponding array cable. Each multiplexer interleaves output signals received from its corresponding array cable in a time-division multiplexing fashion with concatenated output signals received over the trunk cable from the next successive signal handling node.

The advantages of the present invention are numerous. The array cables may be extended vertically to provide resolution of acoustic arrivals in the vertical direction (i.e., angle of depression/elevation). This permits a large array gain in the presence of high-angle noise from nearby ships. The use of vertical aperture arrays also makes this system less prone than horizontal arrays to loss of signals due to the cyclic nature of undersea sound paths which may skip by horizontal bottom-mounted or towed arrays unless under they fall in convergence zones. The use of multiple line arrays affords resolution of arrival angles in an azimuthal direction (i.e., bearing). This allows a large array gain against noise sources at specific bearings. If used as a large aperture array, the present invention could take advantage of matched-field processing. In this way, target range, depth and bearing may be determined by focusing the system on a three-dimensional location, rather than on a planewave direction of arrival in bearing and angle of depression/elevation. Size, cost and power requirements are also minimized by the present invention since no memory or processing is required at the sensor, array, or nodal level. All processing may be carried out at a terminus where power and size requirements are not as critical.

DESCRIPTION OF THE PREFERRED EMBODIMENT

Figure 1:
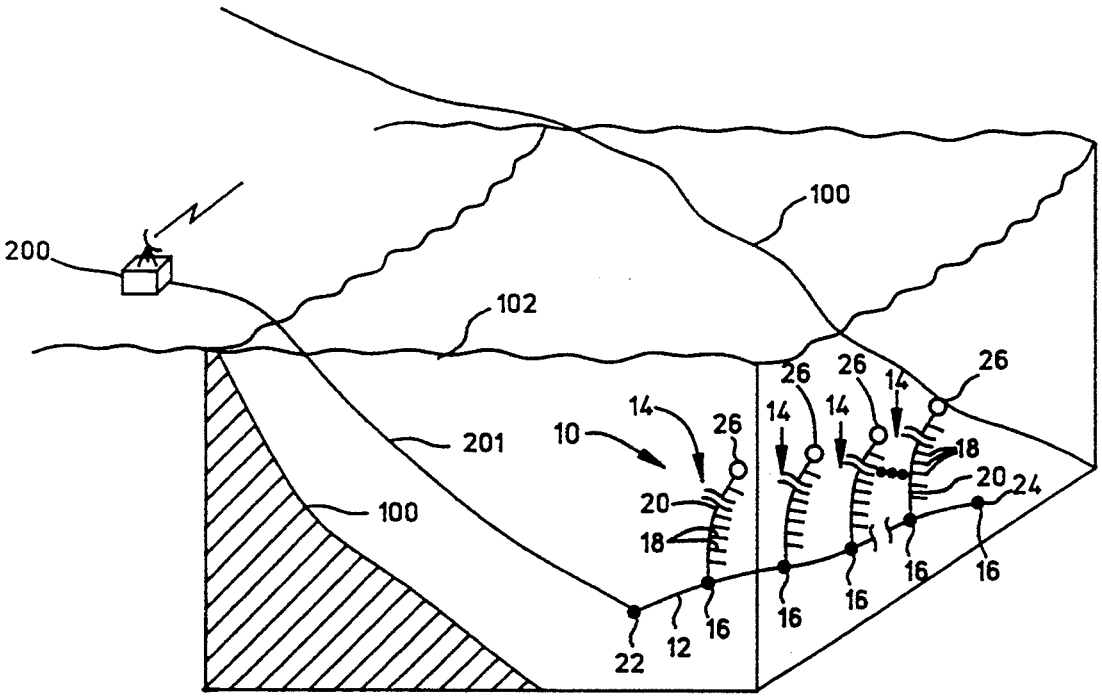
FIG. 1 is a schematic diagram representation of the underwater sensing system according to the present invention deployed in a preferred configuration.

Referring now to the drawings, and in particular to FIG. 1, a schematic diagram is shown of an underwater sensing system 10 according to the present invention. System 10 includes a trunk cable 12 and a plurality of linear sensor arrays 14 appending from trunk cable 12 at corresponding nodes 16. Each sensor array 14 includes a plurality of sensor assemblies 18 installed on an array cable 20. As will be explained in greater detail below, each sensor assembly 18 includes an appropriate sensor and associated circuitry. The appropriate sensor can be any one of appropriate instrumentations for monitoring some ambient phenomena such as acoustic pressure, temperature, or velocity. However, by way of example, the present invention will be described relative to an acoustic sensing system utilizing hydrophones as the appropriate sensor in each sensor assembly 18.

Figure 2:
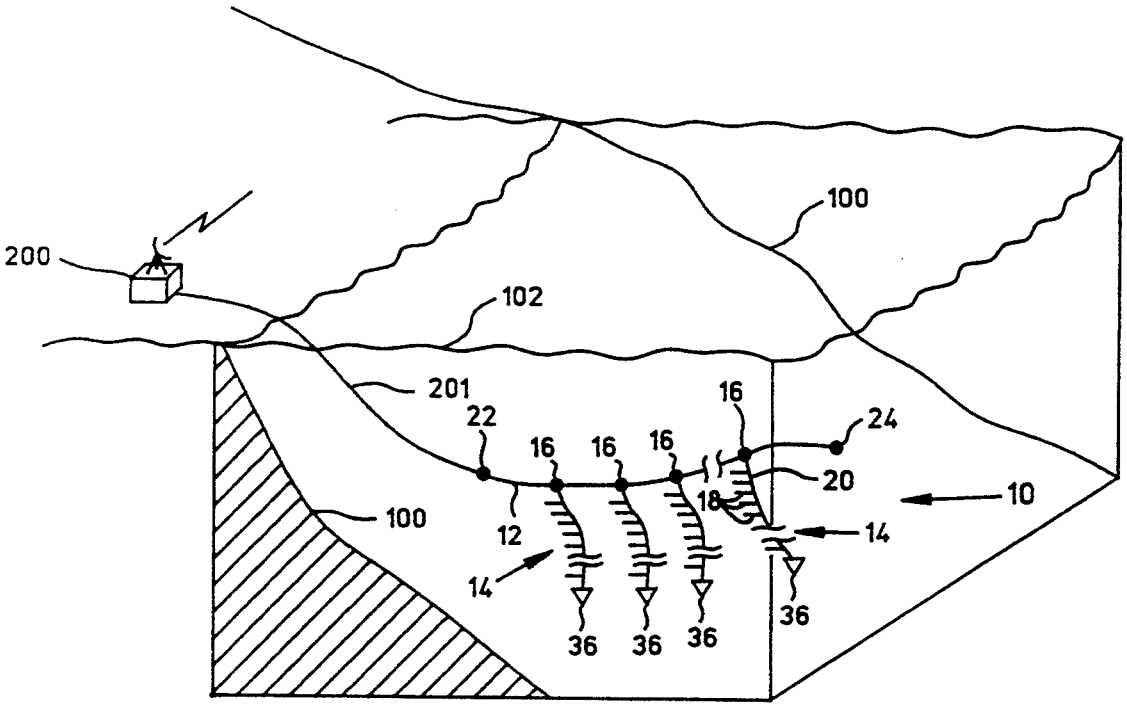
FIG. 2 is a schematic diagram representation of the underwater sensing system according to the present invention deployed in another configuration.

As shown in FIG. 1, trunk cable 12 is anchored to sea floor 100 at either end thereof by suitable weights or anchors 22 and 24, respectively. Each free end of sensor array 14 is provided with a float 26 to extend each sensor array 14 in a substantially vertical and upward direction towards sea surface 102. As another example, system 10 may be deployed as shown in FIG. 2 where trunk cable 12 is still anchored at either end thereof to sea floor 100 by anchors 22 and 24, respectively. However, in this embodiment, each free end of sensor array 14 is provided with a weight 36 to extend each sensor array 14 in a substantially horizontal direction along sea floor 100. In either case, operation of system 10 and processing of data from sensor assemblies 18 is identical.

In operation, a plurality of synchronization or clock signals are continually passed on a transmission line 201 to trunk cable 12 and then on to each successive node 16. Generation of the clock signal may be from a remote terminus 200 located on shore as shown. The terminus may also be located underwater, at sea surface 102 or at one of the nodes located at either end of trunk cable 12 depending on application requirements. The clock signal is passed via each array cable 20 to successive sensor (e.g., hydrophone) assemblies 18. Acoustic pressure samples generated by assemblies 18 are sent back along each array cable 20 to their corresponding node 16 in the order of their relative proximity to their corresponding node as described further below. The sampled data from each sensor array 14 is multiplexed with data from all nodes 16 that are more seaward or further away from the corresponding node, i.e., located between the corresponding node and anchor 24. This process is repeated for each sensor array 14 and corresponding node 16 as the pressure samples are transmitted back towards terminus 200. At node 16 closest to anchor 22, the final multiplexing operation takes place such that the multiplexed signals from all sensor arrays 14 are sent to terminus 200.

Figure 3:
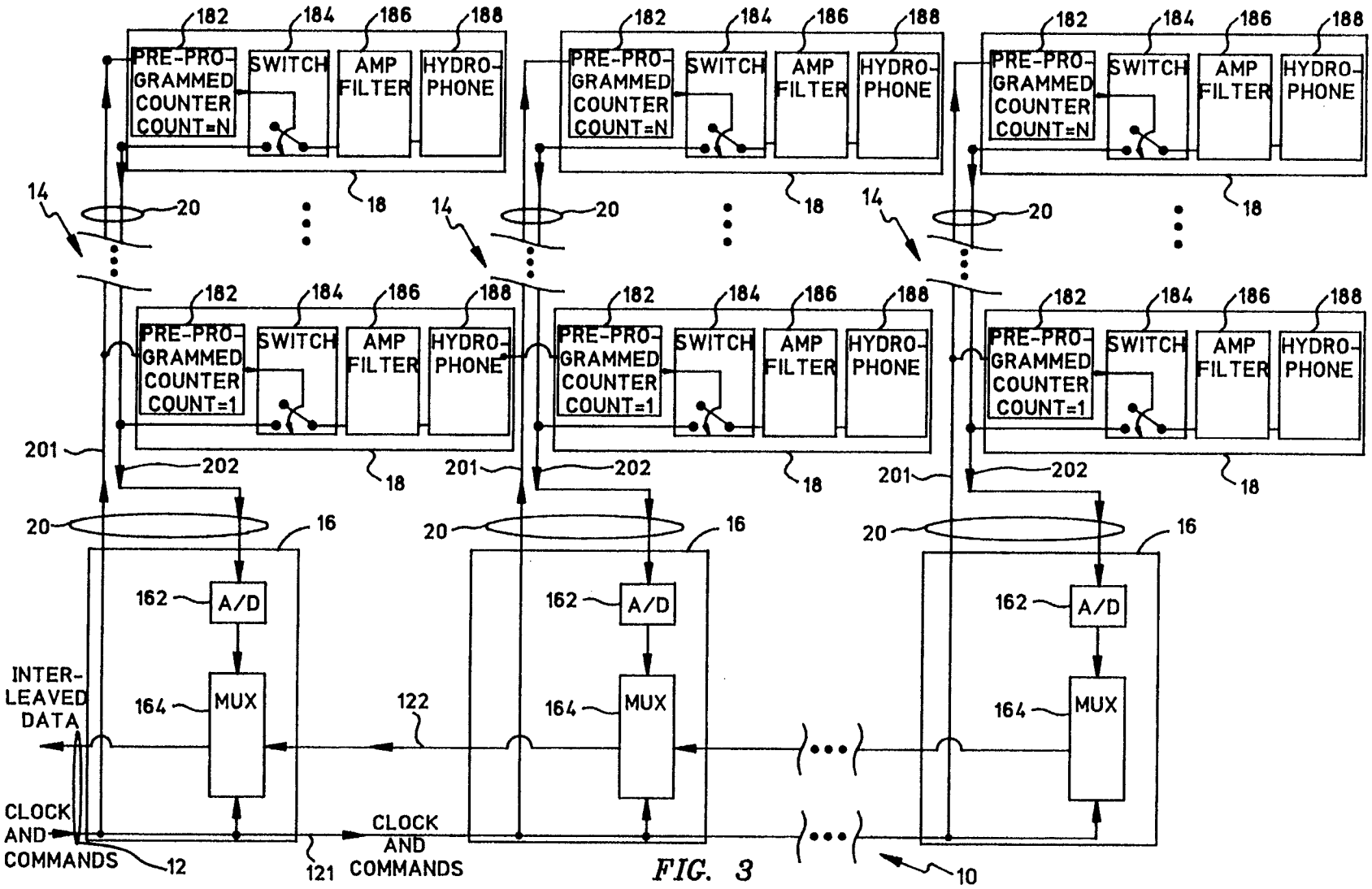
FIG. 3 is a functional block diagram of the telemetry for the underwater acoustic sensing system according to a preferred embodiment of the present invention.

The multiplexing telemetry of the present invention will now be described in greater detail with the aid of FIG. 3. In FIG. 3, a block diagram is shown of the telemetry utilized by an underwater acoustic sensing system embodiment 10. For sake of clarity, systems used to power the present invention have been omitted. Typically, however, batteries could be provided at each node 16 and at each hydrophone assembly 18.

Trunk cable 12 includes signal lines 121 and 122. Line 121 transmits the clock signal to each node 16. In addition, as will be explained further below, line 121 may transmit commands from a terminus (such as terminus 200 shown in FIGS. 1 and 2). The clock signal is tapped off line 121 at each node 16 by line 201 of each array cable 20. Line 201 transmits the clock signal to each hydrophone assembly 18.

The components of each hydrophone assembly 18 include a preprogrammed counter 182, a switch 184, an amplifier and filtering (amp-filter) circuit 186 and a hydrophone sensor 188 (e.g., a piezoelectric element). Sampling of each hydrophone sensor occurs as follows. Upon receiving each clock signal on line 201, each counter 182 increments itself towards a preprogrammed count (e.g., "count=1" for each hydrophone sensor located closest to its respective node, . . . , "count=N" for each hydrophone sensor located furthest from its respective node). Once the preprogrammed count of clock signals is reached, counter 182 enables (i.e., closes) switch 184 which establishes momentary electrical connection between hydrophone 188/amp-filter 186 and line 202. The hydrophone's instantaneous voltage output is thus sampled, amplified and applied to line 202. For each sensor array 14, each successive hydrophone assembly's counter has its preprogrammed count set greater than its predecessor by an equal amount in order of relative proximity to its associated node 16. Thus, for each sensor array 14, successive hydrophones 188 are sampled at equally spaced intervals in time (ignoring the negligibly small time of propagation of the clock signal along line 201) beginning with each hydrophone 188 nearest its associated node 16.

As mentioned above, lines 121 and 201 could also transmit commands from some terminus (not shown in FIG. 3). One such command would be a reset command used to reset each preprogrammed counter to zero when a new measurement sequence was to begin. Other commands might be used to selectively activate/deactivate certain assemblies 18 on sensor array 14. This may be important when selected hydrophone assemblies 18 malfunction or if a particular spatial pattern response is desired. Further, if sensor array 14 has additional sensor assemblies installed to measure other ambient phenomena (e.g., temperature, velocity, etc.), these assemblies may be selectively activated when the measurements are needed. The commands might also be used to calibrate each hydrophone (or other sensor) assembly in situ from a remote location The ordered outputs on each line 202 are input to the corresponding node 16. Specifically, line 202 is input to an analog-to-digital (A/D) converter 162 where the analog signal samples are converted to a digital format. A/D converter 162 outputs its digital stream to a multiplexer (MUX) 164, each of which is synchronized with the clock signal.

The preprogrammed counts are selected such that the time for propagation of electronic clock signals along trunk cable 12 and array cables 20 is very small compared to the time difference between acoustic sampling dictated by the selected preprogrammed counts. Thus, each multiplexer 164 may be considered to receive its first set of digital data from its closest hydrophone assembly at approximately the same time. The second and successive sets of digital data from the next and more successively distant hydrophone assemblies arrive at each multiplexer delayed according to their relative proximity to their corresponding node, i.e., the amount of time associated with their preprogrammed count. Once again, since electronic signal propagation times are very small compared to acoustic sampling intervals, the arrival times of analog data at each node may be considered to be approximately the same for those hydrophone assemblies sharing the same preprogrammed count.

To eliminate the need for memory storage at each node 16, multiplexed data is passed to a terminus in a continual throughput, interleaved format based on each hydrophone assembly's preprogrammed count. In this way, data from the set of hydrophone assemblies nearest their corresponding nodes are transmitted first, i.e., hydrophone assemblies with the lowest common preprogrammed count. Following this set, data from the next nearest set of hydrophone assemblies is transmitted, i.e., hydrophone assemblies with the next lowest common preprogrammed count. This process continues through the last set of hydrophone assemblies. This simple time-division multiplexing based on sensor location in the array allows a large number of sensor outputs from multiple line arrays to be handled in an orderly fashion.

Figure 4:
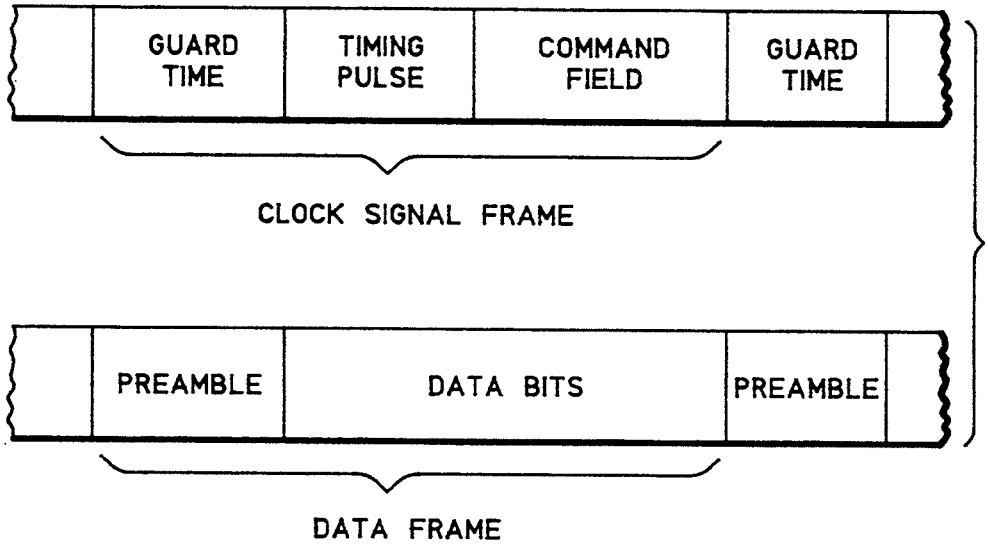
FIG. 4 illustrates a clock signal frame transmitted to the sensing system and a data frame transmitted from the sensing system.

FIG. 4 illustrates an embodiment of each clock signal frame and data frame utilized by the present invention. Each clock signal frame includes a guard time, a timing pulse and, if desired, a command field. The guard time allows for some errors in timing. The timing pulse is used to increment each counter in each respective hydrophone assembly as described above. As mentioned above, the command field is used to at least control each counter's reset operation. Additionally, command field data may be provided, decoded and used to control operations such as hydrophone (or other sensor) calibration, activation of other non-acoustic sensors present in an array, or sub-multiplexing to sample low data rate sensors. Each data frame contains the digital data from successive arrays for hydrophone assemblies sharing a common preprogrammed count. Each data frame is led by a preamble for synchronization in subsequent decoding as is well known in the art. The particular type of modulation scheme for the data is not a limitation of the present invention. Representative modulation schemes could include "non-return to zero" or Manchester encoding.

The particular type of line array and sensor assembly is not a limitation of the present invention. For example, trunk cable 12 and array cable 20 may be fiber optic cables as opposed to electrical cables. In such cases, the hydrophone (or other sensor) output must be converted to an optical signal by means of a conventional electro-optical converter prior to transmission over the optical cables. Array cable 20 may also consist of a single transmission wire that transmits the clock signal, commands and data between a node and its sensor assemblies. In terms of acoustic measurements, each hydrophone assembly 18 and line array 14 may be constructed as a low-power, slack line array as described in a pending U.S. patent application entitled "Novel, Low-Power Circuit for Time-Division Multiplexing Sensor Array Signals", filed by Scott P. McArthur et al. on Apr. 4, 1991, whose Ser. No. is 07/681,230, now U.S. Pat. No. 5,272,476 and which is hereby incorporated by reference. A low-power circuit suitable for use as amp-filter 186 is described by J. R. Olson and R. B. Williams in "Electrical and Mechanical Features of the Slack Line Acoustic Array", Technical Report 1415, Naval Ocean Systems Center, August 1991.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An underwater sensing system, comprising:

a trunk cable for transmission of a plurality of clock signals from a first end to a second end of said trunk cable;

a plurality of signal handling nodes connected to said trunk cable in a spaced apart relationship, wherein each successive one of said plurality of signal handling nodes is located further from said first end of said trunk cable than a preceding one of said plurality of signal handling nodes;

a plurality of sensor arrays, each of said plurality of sensor arrays connected to and extending from a corresponding one of said plurality of signal handling nodes, each of said plurality of sensor arrays connecting a plurality of sensors that generate a data output signal in response to said plurality of clock signals, wherein each said data output signal passes to said corresponding one of said plurality of signal handling nodes; and each said plurality of signal handling nodes including a multiplexer connected to said trunk cable and a corresponding one of said plurality of sensor arrays, for interleaving each said data output signal received from said corresponding one of said plurality of sensor arrays in a continual throughput time orderly fashion with concatenated data output signals received over said trunk cable from said successive one of said plurality of signal handling nodes.

2. A system as in claim 1 further including a flotation system connected to said plurality of sensor arrays for buoyantly extending each of said plurality of sensor arrays from said trunk cable in a substantially vertical direction.

3. A system as in claim 1 further including an anchor system for securing said trunk cable to a sea floor.

4. A system as in claim 3 further including floats connected to said plurality of sensor arrays for buoyantly extending each of said plurality of sensor arrays upward from said trunk cable in a substantially vertical direction.

5. A system as in claim 1 further including weights connected to said plurality of sensor arrays for maintaining each of said plurality of sensor arrays in a substantially horizontal direction extending along said sea floor.

6. A system as in claim 1 wherein each of said plurality of sensor arrays is a linear sensor array.

7. A system as in claim 1 wherein each said sensor further includes a sampling circuit for counting said plurality of clock signals and for sampling each said sensor's response after a predetermined number of clock signals are counted from said plurality of clock signals, wherein said predetermined number for each said sensor is based upon each said sensor's relative proximity to said corresponding one of said plurality of signal handling nodes.

8. A system as in claim 1 wherein each of said plurality of signal handling nodes further includes an analog-to-digital converter for converting each said data output signal received from said one of said plurality of sensor arrays from an analog to a digital format, said analog-to-digital converter outputting each said data output signal in said digital format to said multiplexer located at each of said plurality of signal handling nodes.

9. A system as in claim 1 wherein said plurality of signal handling nodes are electrically connected to said trunk cable, wherein each of said plurality of sensor arrays are electrically connected to said corresponding one of said plurality of signal handling nodes, wherein each of said plurality of sensor arrays electrically connects said plurality of sensors, and wherein each said multiplexer is electrically connected to said trunk cable and said corresponding one of said plurality of sensor arrays.

10. An underwater acoustic sensing system, comprising:

a trunk cable for transmission of a plurality of clock signals from a first end to a second end of said trunk cable;

a plurality of signal handling nodes electrically connected to said trunk cable in a spaced apart relationship, wherein each successive one of said plurality of signal handling nodes is located further from said first end of said trunk cable;

a plurality of electrically conducting array cables, each of said plurality of array cables extending from a corresponding one of said plurality of signal handling nodes and each of said plurality of array cables electrically connected to said trunk cable at said corresponding one of said plurality of signal handling nodes;

a plurality of hydrophone assemblies installed along and electrically connected to each of said plurality of array cables in a spaced apart relationship for receiving said plurality of clock signals, wherein each of said plurality of hydrophone assemblies generates an output signal indicative of an acoustic pressure impinging thereon in response to said plurality of clock signals, and each said output signal passes on a corresponding one of said plurality of array cables to said corresponding one of said plurality of signal handling nodes; and each of said plurality of signal handling nodes including a multiplexer electrically connected to said trunk cable and to said corresponding one of said plurality of array cables, for interleaving each said output signal received from said corresponding one of said plurality of array cables in a continual throughput, time-division multiplexing fashion with concatenated output signals received over said trunk cable from said successive one of said plurality of signal handling nodes.

11. A system as in claim 10 further including an anchor system for securing said trunk cable to a sea floor.

12. A system as in claim 11 further including floats connected to said plurality of array cables for buoyantly extending each of said plurality of array cables upward from said trunk cable in a substantially vertical direction.

13. A system as in claim 11 further including weights connected to said plurality of array cables for maintaining each of said plurality of array cables in a substantially horizontal direction extending along said sea floor.

14. A system as in claim 10 wherein each of said plurality of array cables is a linear array cable.

15. A system as in claim 10 wherein each of said plurality of hydrophone assemblies includes a sampling circuit for counting said plurality of clock signals and for sampling each of said plurality of hydrophone assemblies after a predetermined number of clock signals are counted from said plurality of clock signals, wherein said predetermined number for each of said plurality of hydrophone assemblies is based upon each of said plurality of hydrophone assemblies relative proximity to said corresponding one of said plurality of signal handling nodes.

16. A system as in claim 10 wherein each of said plurality of signal handling nodes further includes an analog-to-digital converter for converting each said output signal received from said corresponding one of said plurality of array cables from an analog to a digital format, said analog-to-digital converter outputting each said output signal in said digital format to said multiplexer located at each of said plurality of signal handling nodes.

17. An underwater acoustic sensing system, comprising:

a trunk cable including first and second electronic signal transmission wires, said first wire for transmission of control commands and a plurality of clock signals from a first end to a second end of said trunk cable;

a plurality of signal handling nodes installed successively along said trunk cable in a spaced apart relationship, each of said plurality of signal handling nodes electrically connected to said first and second wires, wherein each successive one of said plurality of signal handling nodes is located further from said first end of said trunk cable than a preceding one of said plurality of signal handling nodes;

a plurality of array cables, each of said plurality of array cables including corresponding third and fourth electronic signal transmission wires, each of said plurality of array cables having a fixed end anchored to a corresponding one of said plurality of signal handling nodes and having a free-floating end;

a plurality of hydrophone assemblies installed along each of said plurality of array cables in a spaced apart relationship, each said plurality of hydrophone assemblies being further electrically connected to said corresponding third and fourth wires for receiving said control commands and said plurality of clock signals on said corresponding third wire, wherein individual ones of each said plurality of hydrophone assemblies activated by said control commands generate an output signal indicative of an acoustic pressure impinging thereon in response to said plurality of clock signals;

a sampling circuit associated with said individual ones of each said plurality of hydrophone assemblies for counting said plurality of clock signals and for sampling said individual ones after a predetermined number of clock signals are counted from said plurality of clock signals, wherein said predetermined number for each said individual ones is based upon each said individual ones relative proximity to said corresponding one of said plurality of signal handling nodes, and wherein each said output signal is passed to said corresponding one of said plurality of signal handling nodes via said corresponding fourth wire; and each of said plurality of signal handling nodes including a multiplexer electrically connected to said first, second and corresponding fourth wires, each said multiplexer receiving said clock signal and interleaving each said output signal that is delayed and passed on said corresponding fourth wire in a continual throughput, time-division multiplexing fashion with concatenated output signals received over said second wire from said successive one of said plurality of signal handling nodes.

18. A system as in claim 17 further including an anchor system for securing said trunk cable to a sea floor.

19. A system as in claim 18 further including floats connected to each said free-floating end of said plurality of array cables for buoyantly extending each of said plurality of array cables upward from said trunk cable in a substantially vertical direction.

20. A system as in claim 18 further including weights connected to each said free-floating end of said plurality of array cables for maintaining of each of said array cables in a substantially horizontal direction extending along said sea floor.

21. A system as in claim 17 wherein each of said plurality of array cables is a linear array cable.

22. A system as in claim 17 wherein each of said plurality of signal handling nodes further includes an analog-to-digital converter for converting each said output signal received on said corresponding fourth wire from an analog to a digital format, said analog-to-digital converter outputting each said output signal in said digital format to said multiplexer located at each of said plurality of signal handling nodes.

23. A system as in claim 17 wherein said predetermined number increases for each successive one of each said plurality of hydrophone assemblies located further from each said fixed end of each of said plurality of array cables.

24. A system as in claim 17 wherein said predetermined number increases an equal amount for each successive one of each said plurality of hydrophone assemblies located further from each said fixed end of each of said plurality of array cables.

* * * * *